United States Patent Office 3,376,369
Patented Apr. 2, 1968

3,376,369
PROCESS FOR MAKING MOLECULAR ORIENTED FIBERS OF POLYMERIZED LACTAMS
Charles Frank Fisher, Wilmington, Del., assignor to E. I. du Pont de Nemours and Company, Wilmington, Del., a corporation of Delaware
No Drawing. Filed Mar. 13, 1964, Ser. No. 351,859
4 Claims. (Cl. 264—176)

ABSTRACT OF THE DISCLOSURE

Polymerizing an ω-lactam having 5 to 12 carbon atoms, e.g., ε-caprolactam, at a temperature below the crystalline melting point of the resulting polymerized ω-lactam, e.g., poly-ε-caprolactam, by mixing said lactam with from 0.5 to 5 mole percent of an anionic catalyst and from 0.01 to 2 mole percent of an acyclic cocatalyst and maintaining the mixture for a time sufficient to effect polymerization of from 70 to 90% of the monomer. Immediately after polymerization, and prior to crystallization, the partially polymerized material is extruded into fibers having a diameter less than about 20 mils and the temperature of the polymer during extrusion is from 10° to 40° C. below its crystalline melting point.

---

This invention relates to novel synthetic fibers and, more particularly, to fibers of polyamides having axial-lamellar molecular orientation.

It is known that certain ω-cyclic lactams can be polymerized by anionic processes to give high molecular weight polyamide resins, at temperatures substantially below the melting point of the resultant polymer. It has been discovered that when such lactams are polymerized to a degree of polymerization in the range of from 70% to about 90%, and then extruded immediately in a non-crystalline condition at a temperature in the range between about 10° C. to about 40° C. below the crystalline melting point of the resultant polymer, in the form of fibers having a diameter less than about 20 mils, the fibers exhibit unusual physical properties, in particular, an extraordinary degree of elasticity.

The fibers have a molecular structure in which the molecules are ordered in folded chain lamellae, and are preferentially aligned along the fiber axis.

The degree of polymerization may be measured conventiently by the temperature rise of the polymerizing mixture of monomer, catalyst and cocatalyst. The maximum temperature rise of the system under adiabatic conditions (i.e., in the absence of heat flow into or out of the system) is substantially a constant, independent of the temperature. The degree of polymerization can be determined as the percentage of the maximum temperature rise, duly corrected for any heat transfer in the system.

It also has been discovered that the degree of molecular orientation can be further enhanced by the addition of 0.001 to 1% of a nucleating agent such as an alkali metal stearate, or finely divided powders having a maximum particle dimension of less than 1 micron, and characterized by existing in a solid state in the polyamide at the extrusion temperature, and by having active polar surfaces which absorb amide groups at a temperature between the melting point of the polyamide resin and about 30° C. below the melting point, as described in U.S. Patent No. 3,080,345, issued Mar. 5, 1963, to Brooks et al.

The ω-lactams useful in the present invention are those having from 5 to 12 atoms in the lactam ring. Of these ε-caprolactam is especially preferred due to its outstanding physical characteristics such as toughness and tensile strength. Minor amounts of other lactams of polyamide monomers may be included with the predominant ω-lactam so as to form a copolymer if desired. The polymerization mixture for forming polylactams contains from 0.5 to 5 mole per cent, and preferably from 1 to 2 mole percent of an anionic polymerization catalyst. The catalysts are alkali metals or alkaline earth metals in either metallic form or in the form of hydrides, hydroxides, acetates, oxides, borohydrides, carbonates, bicarbonates, amides, methoxides, ethoxides, alkyls, benzoates, or aryls. Examples of preferred catalysts are lithium metal, sodium metal, potassium metal, lithium hydride, sodium hydride, potassium hydride, lithium methoxide, sodium methoxide and potassium methoxide. In addition to the catalyst, it is necessary to have from 0.01 to 2 mole percent, and preferably from 0.2 to 0.5 mole percent of a cocatalyst present. The cocatalysts are generally described as acyclic compounds. Some cocatalysts have a tertiary nitrogen atom which has at least two activating groups such as carbonyls adjacent the nitrogen. Some of these compounds have structures which may be written

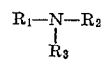

wherein $R_1$ is selected from the group consisting of

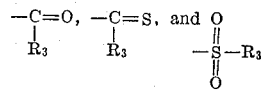

where $R_2$ is selected from the group consisting of $R_1$ and $-N=O$, and $R_3$ is selected from the group consisting of $R_1$, aryls, aralkyls, alkaryls, cycloalkyls, and any of the foregoing substituted with additional radicals selected from the group consisting of carbonyl, N-substituted carbamyl, alkoxy, ether, sulfonyl, and tertiary amino. Examples of such cocatalysts include N-acetyl-2-pyrrolidone, N - acetyl - ε - caprolactam, N - benzoyl - ε - caprolactam, - N - benzoyl - ε - valerolactam, - N - ethyl carbamyl-ε - caprolactam, N - propionyl - ω - caprylolactam, N-toloyl - ω - decanolactam, N - phenylsuccinimide, N-phenyl - maleimide, N - methylsuccinimide, - N - methylphthalimide, - N - acetyltetrahydrophthalamide, N - benzoylsuccinimide, - N - benzoylphthalimide, N,N' - di-(phenylcarbamyl) - N,N' - dimethylurea, ethylene di-succinimide, N,N - diacetylmethylamine, N,N - dibenzoylaniline, triacetamide, N - acetyl - N - formyl ethyl-amine, N - propionylsaccharin, N - acetyl - N - ethyl-p - toluenesulfonamide, N - ethyl - N - lauroylethane-sulfonamide, N,N - diacetylmethanesulfonamide, N-(phenyl - sulfonyl)succinimide, N - methylsaccharin, N-acetylsaccharin, N - acetyl - N - methylbenzesulfonamide, 6,12 - di(phenyl - sulfonyl) - sym - dibenzo - 6,12 - diaza-cyclooctane - 5,11 - dione, N,N - di(p - toluenesulfonyl) anilide, N,N - di - (benzenesulfonyl) - methylamine, N,N - di(methanesulfonyl)ethylamine, N - nitroso - 2-pyrrolidone, N - nitrosuccinimide, N,N - diacetylnitroso-amine, N - nitroso - N - acetyl - propylamine, N - nitroso - N,N' - di - n - butylurea, N - methyl - N - nitro-sourea, N - nitroso - N - methyl - benzenesulfonamide, N - nitroso - N - methyl - toluene - sulfonamide, N - nitroso - N - ethyl - methanesulfonamide, N - nitroso - N-phenylethyl butanesulfonamide, 1 - acetyl - 2 - thiohy-dantoin, N - thiobenzyl - 2 - pyrolidone, N - thio - pro-pionylmaleimide, and N - phenyldithiosuccinimide. Some other cocatalysts have the structures, $R_4-N=C=O$, $R_5-N=C=N-R_6$,

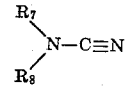

wherein $R_4$, $R_5$, and $R_6$ represent monovalent, saturated, unsubstituted, unbranched or branched alkyl radicals, a monovalent, unsubstituted, cycloalkyl radical, a monovalent, unsubstituted or nucleus-halogenated, unbranched or branched alkaryl radical, and wherein $R_7$ and $R_8$ represent the same radicals as described above for $R_6$ or hydrogen. Examples of such cocatalysts include methyl isocyanate, ethyl isocyanate, n-propyl isocyanate, isopropyl isocyanate, n- butyl isocyanate, 2-butyl isocyanate, phenyl isocyanate, phenylethyl isocyanate, p-diphenyl isocyanate, p - phenylene - diisocyanate, 2,4 - tolylene diisocyanate, di(p - isocyanato - phenyl)methane, 2,2 - di(p - isocyanatophenyl)propane, p,p - diisocyanatodiphenyl - N,N-di(isocyanatoethyl)amine, 1,3,5 - triisocyanatobenzene, 1,3,8 - triisocyanatonaphthalene, tri(p - isocyanatophenyl)methane, 4 - (p - isocyanatobenzyl) - 1,3 - phenylene diisocyanate, 2,5 - di(p - isocyanatophenyl) - phenyl isocyanate, 2,4 - di(p - isocyanatobenzyl)phenyl isocyanate, hexyl isocyanate, octyl isocyanate, cyclohexyl isocyanate, chlorophenyl - isocyanate, diisopropyl - carbodiimide, dibutyl - carbodiimide, dioctyl - carbodiimide, dicyclohexylcarbodiimide, N,N - dicyclohexyl - cyamamide, N - phenyl - N - methyl - cyanamide, N,N - di-phenyl - cyanamide, and N,N - di - (chlorophenyl)-cyanamide the 2/1 adduct of ε - caprolactam and 2,4-toluene diisocyanate, the 2/1 adduct of ε-caprolactam and hexamethylene diisocyanate, the 2/1 adduct of 2-caprolactam and 4,4'-methylene-bis(phenyl isocyanate), the 3/1 adduct of ε-caprolactam and 1,4-xylene-2,4,6-tri-isocyanate, N,N' - carbonyl - biscaprolactam, N,N'-oxalylbiscaprolactam, N,N' - sebacoylbiscaprolactam, N,N-azeloylbiscaprolactam. Other cocatalysts include symmetrical triazine derivatives having the formula

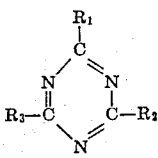

in which $R_1$ is a radical selected from the group consisting of aryloxy, alkaryloxy, nitroaryloxy, and halogen, and $R_2$ and $R_3$ are radicals selected from the group consisting of hydrogen, alkyl, alkenyl, aryl, alkaryl, aryloxy, alkaryloxy, nitroaryloxy, alkoxy, halogen, and dialkylamino. Examples of such cocatalysts include 2,4,6-triphenoxy-s - triazine, 2,4 - diphenoxy - s - triazine, 2,4 - diphenoxy - 6 - dimethylamino - s - triazine, 2,4,6 - tri(p - carbonylphenoxy) - s - triazine, 2,4 - dichloro - 6 - dimethylamino - s - triazine, 2,4 - bis - dichloroamino - 6 - chloro-s - triazine, 2,4 - methoxy - 6 - chloro - s - triazine, 2,4-dichloro - 6 - phenyl - s - triazine, 2,4,6 - trimethoxy - s-triazine, and 2,4,6 - tri(dimethylamino) - s - triazine. Other cocatalysts include substituted benzimido compounds having the formula

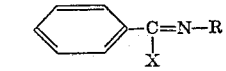

where R is an organic radical particularly a cyclic or acyclic hydrocarbon radical, and X is a halogen or is an —OR' group wherein R' is an acyclic or cyclic hydrocarbon radical. Examples of such cocatalysts include N-phenylbenzimido chloride, N-methylbenzimido chloride, and phenyl N-phenylbenzimido ether. Another class of cocatalysts is the dilactam ethers characterized by the formula

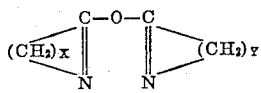

wherein X any Y may be alike or different and represent integers of 3 or greater. Examples of such cocatalysts include dibutyrolactam ether, divalerolactam ether, dicaprolactam ether, dienantholactam ether, dicaproylolactam ether, and dilaurolactam ether. Other effective cocatalysts include 2,2,4,4-tetramethyl-1,3-cyclobutanedione, lactones, particularly β-lactones such as pivalolactone and 2,2,4-trimethyl-3-hydroxy-3- pentenoic acid β-lactone having the structure

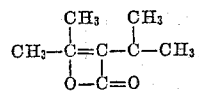

1-diphenylcarbamylimidazole, 1-diphenylcarbamylpyrazole, 1-diphenylcarbamylpyrazole, 1-diphenylcarbamyl-1,2,4-triazole, 1-diphenylcarbamylbenzimidazole, 1-diphenylcarbamylbenzo-1,2,3-triazole, polymers of the formula $-(CF_2S)_x-$ where X is 3,000 to 6,000, 1-dimethylcarbamyl - 3 - methylindazole, 1-dimethylcarbamylpyrazole, 1-diphenylcarbamyl - 3,5 - dimethylpyrazole, 1-diphenylcarbamyl-4-chloropyrazole, 1-dimethylcarbamyl-3,5-dimethylpyrazole, 1-phenylcarbamylimidazole, 1-phenylcarbamyl-1,2,3-triazole, 1-phenylcarbamylpyrazole. Other cocatalysts include monomeric aromatic esters such as phenyl propionate, 2-naphthyl butyrate, 2-(1-amino-naphthyl)stearate, resorcyl diacetate, phloroglucyl tri-propionate, diphenyl 1,1-cyclohexanedicarboxylate, diphenyl 1,4-cyclohexanedicarboxylate, di(4-aminophenyl) terephthalate, phenyl p-aminobenzoate, 2,6-naphthyl diacetate. This class also includes polymeric aromatic esters of the formula

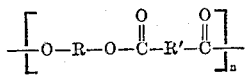

where R is an aromatic biradical bonded through an aromatic carbon to the oxygen atoms adjacent thereto and R' is an aromatic, aliphatic, or cycloaliphatic biradical bonded by at least one group consisting of carbon and tertiary nitrogen directly to the carbonyl radicals adjacent thereto, and $n$ is preferably about from 10 to 500. Such polymeric aromatic esters include poly(hydroquinone adipate), poly(diphenylolpropane terephthalate), poly-(5-chloro-resorcinol-1,4-cyclohexanedicarboxylate), poly-(methoxycatechol sebacate), poly(2-amino-1,5-dihydroxy-naphthalene phioionate), poly(diphenylolpropane adipate), poly(diphenylolpropane 5 tert.-butylisophthalate), poly-[(hydroquinone N,N'-diphenyl)phenylene bis(carbamate)] poly(1,4 - phenylene N - phenylcarbamate), poly-(diphenylolpropane 5-chloroisophthalate), poly(2,2',6,6'-tetrachlorodiphenylolpropane 5-chloroisophthalate), poly-(dipenylolbutane isophthalate), poly(2,2',6,6'-tetrachloro-diphenylolbutane terephthalate), poly(diphenylolpropane terephthalate), poly(4-hydroxybenzoate), poly(4-hydroxy-2-chlorobenzoate), poly(4-hydroxy-4'-biphenylcarboxylate), poly(m - hydroxybenzoate), and poly(4 - hydroxy-2-nitrobenzoate) each of said polymers having an inherent viscosity of from 0.05 to 5.0. Another class of cocatalysts has the formula

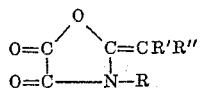

wherein R is a radical selected from the group consisting of alkyl, cycloalkyl and aryl radicals of up to 20 carbon atoms and R' and R'' are radicals of up to 20 carbon atoms selected from the group consisting of alkyl, cycloalkyl and aryl radicals and cycloalkyl radicals containing both R and R''. Examples of such cocatalysts include 2-diethylmethylene-3-ethyloxazolidine-4,5-dione, 2-ethylisopropylmethylene - 3 - ethyloxazolidine-4,5-dione, and 3-butyl-5,5-dimethyl-2-thio-2,4-oxazolidenedione. Another class of cocatalysts is the organic carbonates having at least one carboxylic aromatic group bonded through aromatic carbon to an oxygen of a carbonate group. The carbonate may be monomeric or, preferably, polymeric.

Examples of such monomeric carbonate cocatalysts include diphenyl carbonate, sodium phenyl carbonate

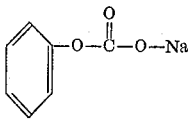

and

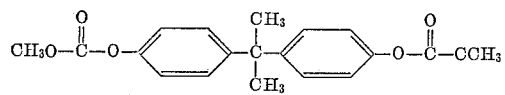

Examples of polymeric organic carbonate cocatalysts include poly-2,2-propanebis(4 - phenyl carbonate), - diethyleneglycolbis(phenyl carbonate)

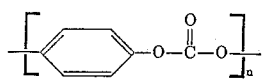

and

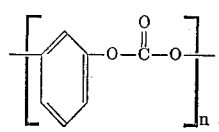

wherein the polymer contains from 10 to 400 monomeric units in each case. Another useful cocatalyst is sebacoylbispyrazole.

In the preferred process of this invention, the ω-lactam, together with the catalyst and cocatalyst, are mixed in an elongated chamber the end of which terminates in a spinneret having holes of suitable dimensions to produce the desired fibers. The length of the chamber is proportioned to give a residence time sufficient to enable polymerization to proceed to about 70% to 90% of completion, as measured by temperature increase. The temperature of the ingredients prior to mixing should be sufficient so that the ultimate temperature of the spinneret is from about 10° C. to about 40° C. below the crystalline melting point of the resultant polymer. For example, in the case of ε-caprolactam, which is the preferred monomer, the initial temperature of the ingredients should be about 150° C., the residence time will vary with the catalyst system employed, but is typically from about 30 seconds to about 5 minutes, and the temperature rise is maintained at about 50° C., corresponding to a degree of polymerization of about 85%, so that the temperature of the product emerging from the spinneret is about 200° C., which is about 25° C. below the crystalline melting point of polycaprolactam.

The polymerizing mixture is forced through the spinneret by conventional spinning pumps and the resulting fibers are drawn off by take-off equipment. The fibers emerging from the spinneret can be drawn down during the crystallization process by suitable adjustments of the relative speed of extrusion and of the take-off. The degree of drawn-down suitably can be from about 2× to about 20×.

Additional ingredients such as pigments, dyes, anti-oxidants, delusterants, sizing agents, and the like, may be added to the molten monomer prior to spinning. In particular, nucleating agents, as described above, may be added to the mixture employed for spinning and have been found beneficial in enhancing the axial-lamellar molecular orientation in the fibers produced by the process of this invention.

It will be realized that the above process may be modified in many ways without departing from the scope of this invention. For example, a portion of the monomer, usually about 50%, may be mixed with the catalyst and the remaining portion of monomer may be mixed with the cocatalyst and thereafter the resultant mixtures may be then mixed together in a gear pump at the entrance to the spinning chamber.

The fibers resulting from the process of this invention are crystalline, and are molecularly oriented, as determined by X-ray diffraction, the molecular chains being preferentially aligned along the fiber axis. The fibers, however, do not exhibit the enhanced tensile strength normally associated with molecular orientation resulting from stretching below the crystalline melting point but rather exhibit a high degree of elasticity. The available physical evidence indicates that the molecular chains are folded back and forth to form plate-like lamellae in which the chains are normal to the major surface of the lamellae. The lamellae appear to be arranged in the fibers so that the substantially flat surfaces of the lamellae are generally normal to the surface of the fiber and to the fiber axis, and the molecular chains are substantially aligned along the fiber axis. It is also believed that adjacent lamellae are united at spaced points by crystalline imperfections. The surprising elasticity of the fibers of this invention is thought to be due to a reversible, partial unfolding of the molecular chain.

The production of the above molecular structure is believed to be caused by the rapid crystallization of the polylactam polymers from the supercooled molten condition. The driving force for crystallization is greater the greater the temperature difference between the extrusion temperature and the crystalline melting point of the polymer. Accordingly, the extrusion temperature should be at least 10° C. below the crystalline melting point of the polylactam. The crystalline melting point is determined as the temperature at which the last trace of crystalline structure disappears under the optical microscope (using crossed polarizers) upon heating a sample from a temperature below the crystalline melting point at a rate of about 1° C. per minute.

On the other hand in order to prevent crystallization before the polymer is formed into a fiber, the extrusion is performed when the polymerization is nearly, but not quite, complete. At lower temperatures the completion of the polymerization is slower, and therefore it is desirable to extrude at a temperature not more than 40° C. below the crystalline melting point.

Nucleating agents which enhance the rate of crystallization have been found beneficial in promoting the unusual molecular orientation of the fibers made according to this invention. Again, the rate of crystallization of the whole fiber, and the orientation of the molecules detailed above, is greater the smaller the diameter of the fiber. The diameter of the fiber is not highly critical, but should be less than about 20 mils in order to achieve substantial axial-lamellar orientation. Larger articles such as rods and the like made by processes similar to the process of the present invention do not exhibit axial-lamellar orientation. No lower limit to the diameter of the fibers is known, but practical considerations limit fiber diameters to about 0.1 mil.

The fibers made by the process of this invention are valuable for the manufacture of textiles and the like. In view of their superior elasticity, fabrics made with such fibers exhibit considerable resistance to creasing.

This invention is further illustrated by the following specific examples which are not, however, intended to limit the scope of this discovery.

EXAMPLE I

ε-Caprolactam is melted in a vessel and ½% by weight of sodium methoxide is added. A nitrogen purge is started and continued for 20 minutes while the vessel is placed in an oil bath at a temperature of 150° C. The molten caprolactam with the sodium methoxide additive is pumped into a tubular reaction vessel terminating in an orifice 10 mils in diameter. At the entrance to the tubular chamber 0.5 part by weight of methylene-bis-(4'-phenyl isocyanate) cocatalyst is added to the mixture. The residence time of the mixture in the chamber is about 2 minutes and the temperature at the orifice, measured by thermocouple, is about 200° C., indicating that polymerization is about 85% complete. A fiber is drawn from the orifice by conventional take-off equipment at a rate sufficient to give a final diameter of 3 mils. The length of path over which the draw-down is accomplished is about 12 inches. The resultant fibers are surprisingly elastic and can be woven into a useful fabric.

The fibers are highly crystalline. X-ray diffraction patterns show that the molecular chains are aligned preferentially along the fiber axis.

EXAMPLE II

The procedure of Example I is repeated except that about 1% by weight of potassium stearate is dissolved in the monomer as a nucleating agent prior to the addition of the methylene-bis-(4'-phenyl isocyanate) cocatalyst. The resultant fibers are even more elastic than the fibers produced by the process of Example I. X-ray analysis shows that the degree of alignment of the molecular chains along the fiber axis is greater than that of the fibers produced by the procedure of Example I.

I claim:

1. A process for making axial-lamellar molecularly oriented fibers of polymerized ω-lactams which comprises polymerizing an ω-lactam having from 5 to 12 carbon atoms at a temperature below the crystalline melting point of the polymerized ω-lactam by mixing the ω-lactam with from 0.5 to 5 mole percent of an anionic polymerization catalyst and from 0.01 to 2 mole percent of an acyclic cocatalyst, and maintaining the mixture for a time sufficient to effect a degree of polymerization of from 70% to 90%, and immediately extruding the partially polymerized mixture prior to crystallization into the form of fibers having a diameter less than about 20 mils, the temperature of extrusion being from 10° C. to 40° C. below the crystalline melting point of the said polymerized ω-lactam.

2. Process of claim 1 in which from 0.001 to 1% by weight of a nucleating agent is added to the ω-lactam prior to polymerization.

3. Process of claim 1 in which the ω-lactam is ε-caprolactam.

4. Process of claim 2 in which the ω-lactam is ε-caprolactam.

References Cited

UNITED STATES PATENTS

| 3,015,652 | 1/1962 | Schnell et al. | 260—78 |
| 3,017,391 | 1/1962 | Mottus et al. | 260—78 |
| 3,017,392 | 1/1962 | Butler et al. | 260—78 |
| 3,018,273 | 1/1962 | Butler et al. | 260—78 |
| 3,028,369 | 4/1962 | Butler et al. | 260—78 |
| 3,037,003 | 5/1962 | Griehl | 260—78 |
| 3,138,574 | 1/1964 | Kohan | 260—78 |
| 3,156,750 | 11/1964 | Cuculo | 264—210 |
| 3,236,817 | 2/1966 | Zimmerman | 260—78 |
| 3,294,757 | 12/1966 | Church | 264—176 X |

FOREIGN PATENTS 939,196  10/1963  Great Britain.

ALEXANDER H. BRODMERKEL, *Primary Examiner.*

DONALD J. ARNOLD, *Examiner.*

J. H. WOO, *Assistant Examiner.*